March 1, 1949.  R. J. EXTER  2,463,164
HAND CART
Filed Feb. 7, 1946
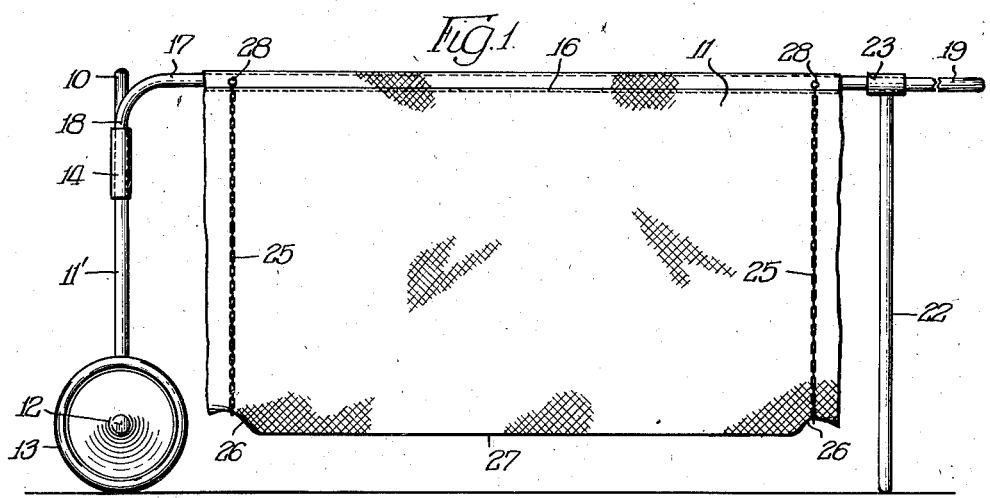
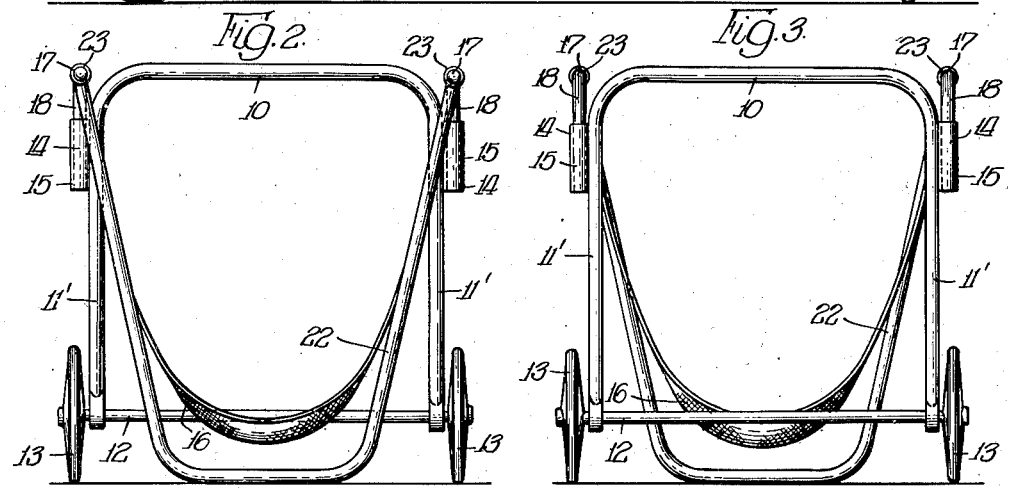
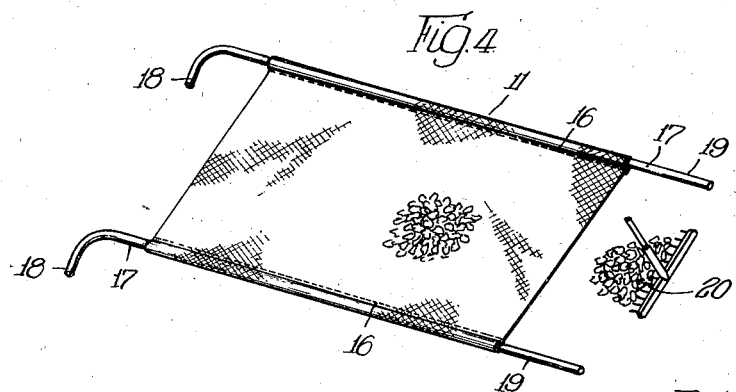
INVENTOR.
Robert J. Exter,
BY Patented Mar. 1, 1949

2,463,164

UNITED STATES PATENT OFFICE 2,463,164

HANDCART

Robert J. Exter, Flossmoor, Ill.

Application February 7, 1946, Serial No. 646,159

6 Claims. (Cl. 280—51)

This invention relates, in general, to a cart or vehicle and has particular relation to an improved vehicle particularly adapted for use in disposing of leaves, grass clippings and the like, although it is to be understood that the vehicle of the present invention may be used for other purposes as suitable and desired.

In disposing of leaves, grass clippings and the like the material is commonly picked up and loaded into a wheelbarrow or other vehicle which is transported to the desired place and unloaded. This requires not only raking or sweeping up the material, but lifting the same into the vehicle, which requires time and frequently results in scattering the material over the ground in the loading process. Material of the class described, while usually light in weight, is bulky, and the wheelbarrows and other vehicles heretofore provided have been of limited capacity with the result that increased trips have been required in disposing of the same.

One of the main objects of the present invention is to provide an improved cart or vehicle having increased capacity and adapted to be loaded more expeditiously, particularly without picking up parts of the load in a plurality of successive operations in loading the vehicle.

Another object of the invention is to provide a vehicle of the class described comprising a vehicle adapted to be manually pushed or drawn to the desired place, and a carrier for removable attachment to the vehicle and adapted to be detached and laid out flat on the ground or to have one side detached and placed on the ground with the other side connected to the vehicle and supporting same in upright position so that the material may be raked or swept directly onto the carrier without picking up parts of the material in a plurality of successive operations.

Another object of the invention is to provide a carrier for the purpose and of the class described comprising flexible fabric material adapted to be placed partially or in its entirety on the ground and, when applied to the vehicle, to assume a depending trough-like form; also a carrier having means for detachably securing the carrier to the vehicle.

Another object of the invention is to provide a carrier of the class described in which the means for detachably securing the carrier to the vehicle comprises a pair of spaced frame members extending at one end from the carrier and turned down to form vertically depending ends for insertion in mounting sockets on the vehicle; also a carrier of the class described in which the spaced frame members extend from the opposite end of the carrier to form handles for transporting the vehicle when the carrier is applied thereto.

Another object of the invention is to provide a vehicle of the class described comprising an arched or inverted generally U-shaped frame having depending legs, with wheels on the lower ends of the legs and sockets on said legs above said wheels for detachably receiving the vertically depending ends of the frame members of the carrier for removably mounting the carrier on the vehicle.

Another object of the invention is to provide means for holding the opposite ends of the flexible carrier above the intermediate portion of its trough-like bottom after the carrier is applied to the vehicle to prevent displacement of the load from the ends of the carrier.

Another object of the invention is to provide a generally V-shaped or U-shaped member for supporting the vehicle rearwardly beyond the carrier, the upper ends of the legs of this member having tubular portions adapted to be slipped telescopically over and removed from the handles of the carrier.

Another object of the invention is to provide a device of the class described having various features of novelty and advantages, and which is particularly characterized by its simplicity in construction, its lightness in weight, its increased capacity, its economy in manufacture, its effectiveness in use, and the facility with which it may be moved over the ground.

Further objects and advantages of the invention will appear from the following detailed description, taken in connection with the accompanying drawing which illustrates the manner of constructing one form of device embodying the present invention.

In the drawings:

Figure 1 is a side elevational view of a cart or vehicle embodying the present invention;

Figure 2 is a rear elevational view;

Figure 3 is a front elevational view of the wheeled frame; and

Figure 4 is a perspective view showing the flexible fabric carrier removed from the wheeled frame and laid flat on the ground; also the manner of thus loading the carrier.

Referring now to the drawings, the cart or vehicle comprises, in general, a wheeled frame 10 and a detachable flexible fabric carrier 11 adapted to be mounted on and removed from the frame 10.

In the illustrated embodiment of the invention, the frame 10 is of generally arched or inverted U-shaped form having depending legs 11'. Adjacent their lower ends the legs 11' carry an axle 12 on which suitable wheels 13 are mounted, one outwardly of and adjacent each leg 11'.

The frame 10 is preferably formed of tubular metal stock and, for the purpose of detachably connecting the carrier 11 to the wheeled frame, short tubular pieces 14 are spot welded or otherwise secured to the outer sides of the upper portions of the depending legs 11' and form vertically disposed sockets 15. The socket forming pieces 14 are preferably formed of tubular metal stock.

The carrier 11 comprises a flat piece of flexible fabric, such as canvas or the like, shown of generally rectangular configuration. The fabric carrier 11 is folded and stitched at 16 along its opposite marginal edges forming parallel folds along the opposite margins of the carrier. The other edges may, of course, be finished as desired.

Frame members 17, also preferably formed of tubular metal stock, extend through the folded margins 16 of the fabric carrier, thereby providing the carrier with spaced and substantially parallel frame members 17. The forward ends of the frame members 17 forwardly of the flexible fabric piece are turned down to form vertically depending ends 18 for insertion into and removal from the carrier mounting sockets 15. The opposite ends of the frame members 17 extend rearwardly from the flexible fabric piece and form handles 19 for moving the vehicle manually over the ground when the carrier 11 is applied to the wheeled frame 10.

In use, when it is desired to load the vehicle, for example, with leaves, grass clippings or the like, the carrier 11 may be removed from the wheeled frame 10 by withdrawing the downturned ends 18 of the frame members 17 from the sockets 15, and placing the flexible fabric carrier 11 flat on the ground as shown in Figure 4. The carrier may then be loaded by merely raking or sweeping, as shown at 20, the leaves, grass clippings or the like directly onto the same. Then with the carrier 11 fully loaded, the carrier with its frame members 17 is lifted from the ground and the depending ends 18 of the frame members 17 are inserted into the sockets 15 as shown in Figure 1. The distance between the legs 11' of the arched frame 10 is less than the distance between the frame members 17, whereby when the frame members 17 are applied to the wheeled frame 10 the fabric carrier assumes a generally trough-like form as shown in Figure 2. This prevents sidewise displacement of the load from the vehicle after it is loaded and in transporting the same.

Instead of completely removing the carrier 11 from the wheeled frame 10 in loading the carrier, the downturned end of only one frame member 17 may be removed from its socket 15 and placed on the ground. This leaves the other frame member 17 connected with the wheeled frame 10 to support the frame 10 in upright position and partially connected to the carrier 11. At the same time, with the other side of the carrier 11 on the ground, the leaves, grass clippings or the like may be raked or swept onto the carrier 11 over the side lying on the ground, and then, upon completing loading of the carrier, this side may be picked up and connected to the wheeled frame 10.

The foregoing picking up or lifting of the loaded carrier is the only picking up or lifting of the load onto the wheeled frame 10, and the entire load is thus picked up and applied to the wheeled frame 10 in one operation and without picking up the material in separate parts and by successive operations as heretofore required. Moreover, by merely raking or sweeping the material onto the carrier as above described, loading of the carrier is greatly facilitated and scattering of the material over the ground in the loading process is avoided.

Upon loading the carrier 11 and applying it to the wheeled frame 10, the handles 19 may be grasped and the vehicle manually pushed or drawn over the ground on the wheels 13 to the place where the load of material is to be disposed of or discharged. The carrier 11 may be unloaded by completely or partially removing it from the wheeled frame 10 and discharging the material from the carrier, or it may be unloaded by tilting the vehicle as desired. After unloading the vehicle, it may be returned to the desired place and reloaded as desired.

If desired, a generally U-shaped or V-shaped member 22 may be provided for supporting the cart or vehicle similar to a wheelbarrow, as shown in Figures 1 and 3. The member 22 is preferably formed of tubular metal stock bent to generally U-shaped or V-shaped form as shown in Figure 2. The bottom of the member 22 is adapted, as also shown in Figure 2, to rest on the ground to support the vehicle. The member 22 has short tubular metal pieces 23 spot welded to the upper ends of the legs thereof. These tubular pieces 23 are adapted to be slipped into place telescopically over the handles 19 and to be removed therefrom. The member 22 may thus be applied for use and removed, or it may be omitted entirely.

Moreover, looped chains, cables or other flexible elements 25 may be provided one adjacent each of the opposite ends of the carrier 11 for supporting the opposite ends 26 of the flexible carrier above the intermediate portion 27 of its trough-like bottom after the carrier is applied to the vehicle to prevent displacement of the load from the ends of the carrier. The flexible elements 25 may be formed in suitable lengths and provided at their ends with fasteners 28 for fastening their ends to the spaced frame members 17, the elements 25 being looped down around and beneath the flexible fabric part of the carrier adjacent its opposite ends.

The embodiment of the invention shown in the drawing is for illustrative purposes only, and it is to be expressly understood that said drawing and the accompanying specification are not to be construed as a definition of the limits or scope of the invention, reference being had to the appended claims for that purpose.

I claim:

1. In a device of the class described, in combination, a vehicle comprising a frame having spaced and substantially vertical sockets thereon, a load carrier comprising the combination of a flexible fabric part, and frame members carried by said fabric part and having beyond one end of the fabric part downturned carrier mounting ends for insertion into said sockets, said last mentioned frame members being spaced apart a distance greater than the distance between said sockets, whereby upon mounting the carrier on the vehicle the fabric part assumes depending trough-like form for preventing sidewise displacement of the load from the vehicle, the downturned ends of said carrier frame members being separately detachable from the vehicle, whereby either side of said carrier may be placed on the ground for loading the carrier.

2. In a device of the class described, in combination, a vehicle comprising an inverted generally U-shaped frame having depending legs, wheels at the lower ends of said legs, substantially vertical sockets on the upper portions of said legs, a load carrier comprising the combination of a flexible fabric part, and frame members carried by said fabric part and having beyond one end of the fabric part downturned carrier mounting ends for insertion into said sockets, said last mentioned frame members being spaced apart a distance greater than the distance between the sockets, whereby upon mounting the carrier on the vehicle the fabric part assumes depending trough-like form for preventing sidewise displacement of the load from the vehicle, the downturned ends of said carrier frame members being separately detachable from the vehicle, whereby either side of said carrier may be placed on the ground for loading the carrier.

3. In a device of the class described, in combination, a vehicle comprising an inverted generally U-shaped frame having depending legs, an axle carried by the lower ends of said legs, wheels on said axle, substantially vertical sockets on the upper portions of said legs, a load carrier comprising the combination of a flexible fabric part having folded marginal edges, and tubular frame members extending through said folded marginal edges and carried by said fabric part, said tubular frame members having beyond one end of the fabric part downturned carrier mounting ends for insertion into said sockets.

4. In a device of the class described, in combination, a vehicle comprising a frame having spaced carrier mounting members thereon, a load carrier comprising the combination of a flexible fabric part, frame members carried by said fabric part and having beyond one end of the fabric part carrier mounting ends adapted to be detachably mounted on the carrier mounting members on the vehicle, said last mentioned frame members being spaced apart a distance greater than the distance between the carrier mounting members on the vehicle, whereby upon mounting the carrier on the vehicle the fabric part assumes depending trough-like form for preventing sidewise displacement of the load from the vehicle, the mounting ends of said carrier frame members being separately detachable from the vehicle, whereby either side of said carrier may be placed on the ground for loading the carrier, the opposite ends of said frame members extending beyond the fabric part and forming handles for moving the vehicle, and a generally U-shaped member adapted to rest at the bottom thereof upon the ground and having tubular portions at the upper ends of its upwardly extending legs adapted to be slipped into place telescopically over said handles and to be removed therefrom.

5. In a device of the class described, in combination, a vehicle comprising a frame having spaced carrier mounting members thereon, a load carrier comprising the combination of a flexible fabric part, frame members carried by said fabric part and having beyond one end of the fabric part carrier mounting ends adapted to be detachably mounted on the carrier mounting members on the vehicle, said last mentioned frame members being spaced apart a distance greater than the distance between the carrier mounting members on the vehicle, whereby upon mounting the carrier on the vehicle the fabric part assumes depending trough-like form for preventing sidewise displacement of the load from the vehicle, the mounting ends of said carrier frame members being separately detachable from the vehicle, whereby either side of said carrier may be placed on the ground for loading the carrier, and flexible elements adapted to be secured to said frame members and looped down and beneath the loaded fabric part to hold the opposite ends of said fabric part above the intermediate portion of its trough-like bottom after the carrier is applied to the vehicle to prevent displacement of the load from the ends of the carrier.

6. In a device of the class described, in combination, a vehicle comprising a frame having spaced carrier mounting members thereon, a load carrier comprising the combination of a flexible fabric part, frame members carried by said fabric part and having beyond one end of the fabric part carrier mounting ends adapted to be detachably mounted on the carrier mounting members on the vehicle, said last mentioned frame members being spaced apart a distance greater than the distance between the carrier mounting members on the vehicle, whereby upon mounting the carrier on the vehicle the fabric part assumes depending trough-like form for preventing sidewise displacement of the load from the vehicle, the mounting ends of said carrier frame members being separately detachable from the vehicle, whereby either side of said carrier may be placed on the ground for loading the carrier, the opposite ends of said frame members extending beyond the fabric part and forming handles for moving the vehicle, a generally U-shaped member adapted to rest at the bottom thereof upon the ground and having tubular portions at the upper ends of its upwardly extending legs adapted to be slipped into place telescopically over said handles and to be removed therefrom, and flexible elements adapted to be secured to said frame members and looped down and beneath the loaded fabric part to hold the opposite ends of said fabric part above the intermediate portion of its trough-like bottom after the carrier is applied to the vehicle to prevent displacement of the load from the ends of the carrier.

ROBERT J. EXTER.

REFERENCES CITED

The following references are of record in the file of this patent:

UNITED STATES PATENTS

| Number | Name | Date |
| --- | --- | --- |
| 547,288 | Remington | Oct. 1, 1895 |
| 568,811 | Stoll | Oct. 6, 1896 |
| 2,089,801 | Kennedy | Aug. 10, 1937 |

FOREIGN PATENTS

| Number | Country | Date |
| --- | --- | --- |
| 76,423 | Germany | Aug. 23, 1893 |
| 638,870 | France | Feb. 28, 1928 |